United States Patent [19]

Lin et al.

[11] Patent Number: 5,316,854
[45] Date of Patent: May 31, 1994

[54] GLASS OR QUARTZ ARTICLES HAVING HIGH TEMPERATURE UV ABSORBING COATINGS CONTAINING CERIA

[75] Inventors: Chia-Cheng Lin, Allison Park; John D. Basil, Pittsburgh; Robert M. Hunia, Kittanning; Peter P. Bihuniak, Franklin Township, Venango County, all of Pa.

[73] Assignee: PPG Industries, Inc., Pittsburgh, Pa.

[21] Appl. No.: 802,914

[22] Filed: Dec. 6, 1991

[51] Int. Cl.$^5$ .................... B32B 17/06; B32B 9/00
[52] U.S. Cl. .................. 428/426; 428/336; 428/328; 428/428; 428/432; 428/429; 428/446; 428/447; 428/688; 428/689; 428/697; 428/702; 501/64; 106/287.13
[58] Field of Search ............ 428/336, 426, 428, 429, 428/446, 447, 688, 689, 697, 702, 432, 328; 501/12, 64; 106/287.13, 287.14, 287.15

[56] References Cited

U.S. PATENT DOCUMENTS 4,028,085 6/1977 Thomas ........................... 501/12
4,528,212 7/1985 Cairns ............................ 428/428

Primary Examiner—Ellis P. Robinson
Assistant Examiner—Timothy M. Speer
Attorney, Agent, or Firm—Donna L. Seidel

[57] ABSTRACT

An ultraviolet radiation absorbing coating comprising cerium oxide in an inorganic oxide matrix formed by the hydrolysis and condensation of alkoxysilane and/or other metal alkoxide or oxide which has a higher absorbance per unit thickness of coating by virtue of its much higher concentration of colloidal particles in said matrix and a reduced tendency to craze when exposed to temperatures in excess of 1000° C. and/or temperature cycling between ambient temperature and 1000° C. by virtue of heating a coated article at elevated temperature between 500° C. and 1100° C. before cooling the coated article.

10 Claims, No Drawings

GLASS OR QUARTZ ARTICLES HAVING HIGH TEMPERATURE UV ABSORBING COATINGS CONTAINING CERIA

FIELD OF INVENTION

This invention relates to glass or quartz substrates coated with sol-gel coatings containing ceria to absorbing ultraviolet radiation, particularly that band of radiation having wavelengths shorter than 320 nanometers and longer than 200 nanometers.

BACKGROUND OF THE INVENTION AND DISCUSSION OF PRIOR ART

High intensity discharge tungsten halogen and metal halide lamps enclosed in quartz housings emit high levels of ultraviolet radiation which are not sufficiently blocked by their quartz housings. It is necessary to apply a suitable UV absorbing coating to absorb wavelengths less than 320 nanometers in order to protect personnel from detrimental health problems and interior furnishings and lamp fixtures. Sol gel coatings comprising colloidal cerium oxide particles in an inorganic oxide matrix formed by the hydrolysis and condensation of an alkoxysilane and/or other metal alkoxide have been developed for coating plastic substrates. These coatings have an absorbance of 0.1 to 0.25 per micron of coating thickness and require a thickness of several microns to assure an absorbance greater than 1, the minimum considered needed to prevent damage from exposure to dangerous ultraviolet radiation if such protective coatings are absent.

The techniques developed for coating plastic substrates with cerium oxide containing coatings of necessity are limited to a maximum curing temperature to cure the coated plastic substrates to insure the integrity of the substrate. Thus, prior art curing steps were performed at maximum temperatures of 120° C. to 130° C. When techniques developed for coating plastic substrates with these cerium oxide coating compositions were used on glass or quartz substrates cured under conditions suitable for plastic substrates, the absorbance obtained was on the order of magnitude developed for coated plastic substrates. However, coatings applied to glass or quartz substrates crazed and/or peeled when heated to elevated temperatures beyond the curing temperatures used for coating plastic substrates.

High intensity lamps enclosed in quartz housing cause the coatings applied by the techniques developed for coating plastic substrates to craze when the coated quartz housings are heated to temperatures exceeding 1000° C., such as those approaching 1100° C., during use. Also, when such lamps are not used continuously, they are subjected to temperature cycles that vary between ambient temperature and the aforesaid elevated temperatures. These wide temperature cycles increase the chance of the coating to craze and peel. A technique was needed to enable those skilled in the art of coating glass and quartz to obtain the benefits of the well known ultraviolet absorbance of coatings comprising colloidal cerium oxide particles essentially uniformly diffused through a silica-based matrix while avoiding the problem of crazed coatings associated with exposure of the coated article to elevated temperatures and of haze problems that occur due to agglomeration of the colloidal cerium oxide particles when the latter are not passivated efficiently in the oxide matrix.

U.S. Pat. No. 4,799,963 to Basil et al. discloses ultraviolet radiation resistant coatings comprising colloidal cerium oxide. Coatings that protect plastic substrates such as polycarbonate from damage caused by ultraviolet radiation are formed from aqueous sols containing colloidal cerium oxide and a glassy network of materials derived from metal alkoxides such as alkoxysilanes and other metal alkoxides. The alkoxysilane may be an organoalkoxysilane, such as an alkylalkoxysilane or organofunctional alkoxysilane. The alkoxide may contain alkyl or aryl groups and may be in higher condensed form so long as hydrolyzable alkoxide groups remain. The alkoxide may be added directly to an aqueous cerium oxide sol, with or without additional solvent such as alcohol. Hydrolysis and condensation polymerization occur in situ. Alternatively, the alkoxide may be partially or fully hydrolyzed, and condensed to some extent prior to combination with the cerium oxide sol.

The resulting silane/ceria sol may be used as a coating composition for either a primer or protective overcoat on a substrate or coated substrate. Or, the silane/ceria sol may be added to other coating compositions to increase their resistance to ultraviolet radiation. In either case, the coating compositions may be applied by any conventional technique, such as spraying, dipping or flow coating. The composition dries and cures to form a uniform durable coating with good adhesion to plastic substrates such as polycarbonate. The coating protects the substrate from ultraviolet radiation by providing a strong, broad absorption band in the 200 to 320 nanometer range.

In a preferred embodiment of Basil, an alkoxide is partially hydrolyzed before adding an aqueous sol of colloidal cerium oxide. Preferably, the alkoxide is an alkoxysilane of the general formula $R_xSi(OR')_{4-x}$ wherein R is an organic radical, R' is selected from the group consisting of low molecular weight alkyl radicals, and x is less than 4 and may be zero. The organic radical of R is preferably alkyl, vinyl, methoxyethyl, phenyl, γ-glycidoxypropyl, or γ-methacryloxypropyl. The alkoxide hydrolyzes according to the general reaction

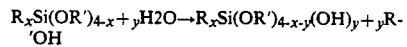

Condensation of the hydrolyzed alkoxide proceeds according to the general reactions

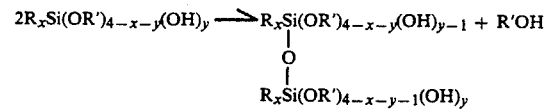

or

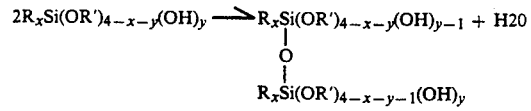

Further hydrolysis and condensation follow.

The pH and/or degree of condensation of the alkoxides may be adjusted, if necessary, to prevent haze or precipitation upon mixing with the ceria sol. The cerium oxide sol preferably comprises about 10 to 30 percent by weight colloidal cerium oxide in water, with the colloidal cerium oxide particle size sufficiently small to minimize scattering of visible light, preferably less than 30 to 40 nanometers, most preferably less than 10 nanometers. Alkoxides of titanium and/or zirconium may also be included in compositions of Basil, as well as colloidal silica for abrasion resistance. The ultraviolet radiation protection provided by the cerium oxide containing coating of Basil may be determined by measuring the UV absorbance spectrum of the coating applied on a quartz substrate.

The Basil patent includes two examples of primed polycarbonate substrates and two examples of quartz substrates coated by applying aqueous sols containing colloidal cerium oxide and a network forming metal alkoxide to measure the absorbance of the coatings. The sols formed coatings containing on the order of 7 weight percent and 4 to 5.5 mole percent of cerium oxide based on the total metal oxide of the coatings. The coatings were cured at temperatures ranging up to on the order of 120° C. A coating thickness of 6.5 microns was reported. The absorbance of the resulting coatings was on the order of 0.1 to 0.2 per micron of coating thickness.

The coatings containing colloidal cerium oxide reduced the tendency of polycarbonate articles of Examples I and II of the Basil patent to become yellow and embrittled upon exposure to UV radiation. The coatings applied to quartz improved the UV absorbance of the quartz articles of Examples III and IV. There is no report of testing these coated articles at elevated temperatures to determine the resistance of crazing of these coatings at such elevated temperatures.

U.S. patent application Ser. No. 546,484, filed Jun. 29, 1990, by Lin et al. discloses and claims an abrasion resistant coating of organic hybrid polymers of alkoxysilanes containing colloidal cerium oxide for ultraviolet absorption properties that are formed from siloxane compositions that also contain polyvinyl pyrrolidone and sodium acetate applied to a rigid transparent plastic substrate treated with an acrylic primer by dip coating for five minutes at room temperature and cured at 120° C. to develop a cured coating having a preferable thickness of about four microns. The polyvinyl pyrrolidone is provided to optimize film formation and the sodium acetate is added to promote complete cure of the siloxane polymer preferably in the range of 80° C.

From the foregoing, it is evident that prior to the present invention, it was known to coat plastic and quartz substrates with sol-gel compositions containing colloidal cerium oxide particles in an inorganic oxide matrix formed by the hydrolysis and condensation of an alkoxysilane and/or other metal alkoxide to improve the UV absorbance of the coated substrates and reduce exposure of the substrates to UV radiation. Curing was accomplished at temperatures sufficient to bond the coating to the substrate without harm to the plastic substrate. The prior art did not appreciate that the low curing temperatures used after coating plastic substrates with such sol-gel compositions would not be suitable to insure craze-free coatings on quartz or glass substrates when quartz or glass substrates are exposed to elevated temperatures after being cured at the low curing temperature suitable for plastic substrates. Also, the prior art did not appreciate that the prior art concentrations of colloidal cerium oxide particles in sol-gel compositions necessitated coatings of such thickness required for a desired high level of absorbance that obtaining a crack-free, non-peeling coating was precluded.

The prior art was not aware that the higher curing temperatures after coating would reduce and even eliminate crazing of glass or quartz substrates coated with sol-gel compositions containing colloidal cerium oxide particles when the coated substrates are exposed to elevated temperatures and/or that using coating compositions having higher concentrations of colloidal cerium oxide than those used in the prior art would provide coatings having greater absorbance per unit thickness than those obtained from the prior art techniques, thereby obtaining better bonding of a sol-gel coating to a glass or quartz substrate for any desired absorbance.

SUMMARY OF THE INVENTION

This invention minimizes emission of UV radiation from lamps enclosed in glass or quartz envelopes over a wide temperature range and for an extended period of use. Quartz envelopes, particularly those used to encase high intensity lamps that irradiate energy having a high concentration of UV radiation, are coated with a sol-gel coating containing a high concentration of colloidal cerium oxide particles in a silica-based matrix that may also include oxides of zirconium, titanium and/or aluminum and/or other metals. By virtue of the higher concentration of cerium oxide (more than on the order of 40 percent by weight corresponding to more than 20 mole percent for the present invention compared to on the order of less than 10 percent by weight corresponding to on the order of less than 8 mole percent for the prior art) in the coating resulting from the application and curing of the sol-gel composition, the present invention provides coatings having absorbances ranging from at least 1 to as much as 3.2 per micron of coating thickness compared to 0.1 to 0.25 per micron of thickness for prior art coatings at a wavelength of 320 nanometers.

In addition, because the applied sol-gel coatings are heat treated at temperatures ranging from about 500° C. to above 1000° C. instead of the prior art curing temperatures on the order of 80°–130° C., the resulting coatings are less likely to craze or peel when the coated glass or quartz substrates prepared in the manner of this invention are subjected to elevated temperatures approaching 1100° C. and/or temperature cycles ranging between ambient temperature and over 1000° C.

The prior art suggests the need to prime plastic substrates prior to coating with a sol-gel coating. This invention has found that glass or quartz substrates need not be primed prior to applying a sol-gel composition containing a higher concentration of colloidal cerium oxide than the prior art.

The prior art suggested colloidal particles of ceria having a particle size of 5 to 15 nanometers. While such a range of particle sizes produces good UV absorbance in coatings in the thickness range of approximately 5 microns, better results can be obtained when the average particle size of colloidal ceria is on the order of 5 nanometers and most preferably when a large portion of colloidal ceria particles are in the size range of 3 to 5 nanometers and the concentration of colloidal ceria particles in the resulting coating is more than 40 weight percent based on total metal oxide in the cured coating.

DESCRIPTION OF PREFERRED EMBODIMENTS

Preferred coatings that protect the environment by coating glass or quartz envelopes that encase high intensity lamps comprise sol-gel compositions containing colloidal cerium oxide and a glassy network of materials derived from metal alkoxides such as alkoxysilanes and other metal alkoxides. The alkoxysilane may be an organoalkoxysilane, such as an alkylalkoxysilane or organofunctional alkoxysilane. The alkoxide may contain alkyl or aryl groups and may be in dimer or higher condensed form so long as hydrolyzable alkoxide groups remain. The alkoxide may be added directly to an aqueous cerium oxide sol, with or without additional solvent such as alcohol. Hydrolysis and condensation polymerization occur in situ. Alternatively, the alkoxide may be partially or fully hydrolyzed, and condensed to some extent prior to combination with the cerium oxide sol.

The resulting silane/ceria sol may be used as a coating composition for a glass or quartz substrate that need not be primed. The coating compositions may be applied by any conventional technique, such as spraying, dipping or flow coating. The composition dries and cures to form a uniform durable coating with good adhesion to the glass or quartz substrate. The coating provides a strong, broad absorption band below 320 nanometers that protects the environment surrounding the envelope for the high intensity lamps.

In a preferred embodiment, an alkoxide is partially hydrolyzed before adding an aqueous sol of colloidal cerium oxide. Preferably, the alkoxide is an alkoxysilane of the general formula $R_xSi(OR')_{4-x}$ wherein R is an organic radical, R' is selected from the group consisting of low molecular weight alkyl radicals, and x is less than 4 and may be zero. The organic radical of R is preferably alkyl, vinyl, methoxyethyl, phenyl, γ-glycidoxypropyl, or γ-methacryloxypropyl. The alkoxide hydrolyzes according to the general reaction

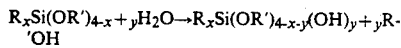

Condensation of the hydrolyzed alkoxide proceeds according to the general reactions

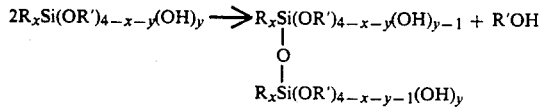

or

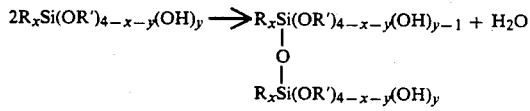

Further hydrolysis and condensation follow.

The pH and/or degree of condensation of the alkoxides may be adjusted, if necessary, to prevent haze or precipitation upon mixing with the ceria sol. The cerium oxide sol preferably comprises about 10 to 30 percent by weight colloidal cerium oxide in water, with the colloidal cerium oxide particle size sufficiently small to minimize scattering of visible light, preferably less than 30 to 40 nanometers, most preferably less than 10 nanometers. Alkoxides of titanium, zirconium, boron, and/or aluminum and/or other metals may also be included in compositions of this invention, as well as colloidal silica. The amount of aqueous dispersion of colloidal ceria that is mixed with the other alkoxides is such as to obtain a coating that contains at least about 40 weight percent of colloidal cerium oxide based on the total weight of the metal oxides in the final coating.

A substrate of glass or quartz may be coated by dipping or draining into the coating composition. The thickness of the resulting coating does not depend on the dwell time of the substrate within the coating composition but upon the speed at which the substrate is separated from the coating composition. Generally, the coating composition is at room temperature when the substrate is withdrawn, but the coating composition temperature may vary somewhat from room temperature.

In dipping, a lamp with a quartz envelope is dipped in a coating composition and withdrawn from the composition at a speed in the range of 0.5 to 6 inches per minute depending on the coating thickness desired and the shape of the lamp.

In draining, the lamp with the quartz envelope is lowered into a coating composition with a minimum half inch vapor zone and the composition is drained away by gravity or pumping at a rate of 0.5 to 6 inches per minute.

Coatings can also be made by spraying. For example a substrate is held within a surrounding spray lead that delivers a diluted coating composition onto the substrate while the latter rotates at high speed.

After the coating is applied to the substrate, the coated substrate is fired to an elevated temperature depending on the composition of the alkoxide component of the coating composition and the temperature to which the coated article is exposed during use. Some alkoxide compositions require curing at about 1000° C., the temperature to which the high intensity lamp heats the coated quartz envelope during use. Other alkoxide compositions forming a component of the coating composition are suitable to form a sol-gel coating comprising cerium oxide that retains its UV absorbance and craze-free characteristics and allows exposure to temperature cycling between ambient temperature and about 1000° C. after initial heat treatment at a temperature of about 550° C.

The present invention will be better understood in the light of the description of specific examples that follows. It is understood that small amounts of additives may be incorporated in the coating compositions to control pH and other factors without departing from the gist of this invention. In the tests reported in the Examples, colloidal cerium oxide having an average particle size on the order of 5 nanometers was used with a considerable population of particles in the 3 to 5 nanometer range.

EXAMPLE I

An aqueous sol containing 75 grams of 20 percent by weight of colloidal cerium oxide from Rhone-Poulenc was stirred at room temperature. A combination of 10 grams of methyl trimethoxysilane (Union Carbide A-163) and 10 grams of tetraethyl orthosilicate (TEOS) was added to the stirring cerium oxide sol and the resulting mix was stirred for 3 hours at room temperature. A combination of 10 grams 2-propanol, 5 grams diacetone alcohol and 0.1 gram of a fluorosurfactant sold as Dupont FSN was added to the previous combination and the resulting mixture was stirred overnight at room temperature. A quartz plate was immersed in the mixture and withdrawn at a constant speed to develop a coating having a thickness of 0.6 to 0.9 micron. The coated substrate was heated to 1000° C. and the resulting coating had an absorbance of 2.4 at 320 nanometers. There was no crazing in the coating after repeated cooling to ambient temperature and reheating to 1000° C. The concentration of cerium oxide in the cured coating was determined to be 67.29 weight percent and 44.76 mole percent based on total metal oxide content. The absorbance of the coating was estimated to be on the order of 3.2 per 1.0 micron of coating thickness at 320 nanometers.

EXAMPLE II

The same quantities of ingredients combined in Example I were combined as in Example I, but the coated quartz plate was heated to 550° C., then cooled to room temperature and reheated to 1000° C. The coating crazed on reheating to 1000° C. Its absorbance after initial heating and cooling was 2.4.

EXAMPLE III

The same quantities of ingredients as in Examples I and II were combined and quartz plates heated as in Example I, then cooled to room temperature were again immersed in the resulting mixture of Example I and reheated to 1000° C. The multiple layers remained and were free of crazing after cooling to room temperature and reheating to 1000° C.

EXAMPLE IV

The treatment of Example II was repeated for the application of a second coating and curing at 550° C. The multiple layers tended to craze when subjected to higher heating to 1000° C. after cooling to room temperature.

EXAMPLE V

Twenty-five grams of γ-glycidoxypropyl trimethoxysilane (Union Carbide A-187) were stirred at room temperature. A combination of 10 grams of titanium tetraisopropoxide (TPT), 1.6 grams of water and 0.25 grams of acetic acid was added to the A-187. Colloidal cerium oxide, 65 grams of a 20 weight percent aqueous dispersion, was slowly added, and the resulting mixture stirred overnight at room temperature. The following day, a mixture of 30 grams of 2-propanol, 15 grams diacetone alcohol and 0.1 gram of a fluorinated surfactant (DuPont FSN) was combined and stirred at room temperature. A quartz plate was immersed in the resulting mixture and heated to 1000° C. to develop a coating 0.6 to 0.9 microns thick having an absorbance of 2.4 at 320 nanometers. Another quartz plate immersed in the resulting mixture followed by heating to 550° C. developed an absorbance of 1.6 at 320 nanometers and a thickness of 0.6 to 0.9 microns. Both films had excellent resistance to craze on reheating to 1000° C. after cooling to room temperature. Multiple layers were applied successfully, and cooling to room temperature followed by heating to 1000° C. was endured without crazing. The resulting cured coatings had a cerium oxide concentration of 58.65 percent (34.88 mole percent) based on the total concentration of silica, titania and cerium oxide in the coatings.

EXAMPLE VI

A combination of 25 grams LUDOX LS (DuPont), an aqueous dispersion of colloidal silica sol containing 30 weight percent of silica and 2 grams of acetic acid was mixed and stirred at room temperature. Thirty-five grams of γ-glycidoxypropyl trimethoxysilane (A-187) was slowly added and stirred for one-half hour. Sixty-five grams of an aqueous dispersion of 20 weight percent of colloidal cerium oxide was slowly added and the mixture stirred at room temperature overnight. A combination of 30 grams of methyl alcohol and 0.1 gram of fluorinated surfactant (DuPont FSN) was combined with the previous mixture and stirred at room temperature. Quartz plates were immersed in the resulting mixture and removed at a rate to develop a coating having a thickness in the 1.6 to 2.1 micron range and an absorbance of 2.8 which is estimated to correspond to an absorbance of about 1.5 per 1.0 micron of thickness at a wavelength of 320 nanometers. Some of the coated quartz plates were heated to 550° C. and others to 1100° C. Plates treated by heating to either temperature had excellent reheat craze resistance after cooling down to room temperature followed by heating to 1100° C. These coated plates also were capable of supporting multiple layers of coating without crazing. The resulting coatings had an analysis of 44.15% by weight (21.66 mole percent) of cerium oxide, 55.68 weight percent (78.33 mole percent) of silica.

EXAMPLE VII

A combination of 65 grams of an aqueous sol of 20 weight percent of colloidal cerium oxide and 2 grams of acetic acid was made and stirred at room temperature. To the stirred combination was slowly added 35 grams of γ-glycidoxypropyl trimethylsiloxane (A-187). The combination with additive was stirred for 4 hours and then combined with a mixture of 50 grams of methanol and 0.1 gram of fluorinated surfactant (DuPont FSN), which combined mixture was stirred at room temperature. Quartz plates were immersed and removed from the combined mixture at a rate to develop coatings in the range of 0.6 to 0.9 microns thick. The coatings had an absorbance of 1.6, which is estimated to correspond to absorbance of about 2.1 per micron of coating thickness. Coated quartz plates cured by heating to 550° C. after coating were susceptible to crazing after cooling to room temperature followed by reheating to 1100° C. Other coated substrates cured by heating to 1100° C. did not show crazing after cooling to room temperature followed by reheating to 1100° C. Multiple layers were coated without causing the original coatings cured by heating to 1100° C. to craze. The analysis of the coating was cerium oxide 59.37 weight percent (33.76 mole percent) and silicon oxide 40.63 weight percent (66.24 mole percent).

EXAMPLE VIII

In a manner similar to that described in Example VI, a combination of 18.8 grams of Ludox AS, an ammonium stabilized aqueous colloidal silica sol containing 40 weight percent of silica, and 2 grams of glacial acetic acid was mixed and stirred at room temperature. Twenty-five grams of A-187 was added and the mixture was stirred for 15 minutes. Sixty-five grams of an aqueous dispersion of 20 weight percent of colloidal cerium oxide was slowly added and the mixture was stirred at room temperature overnight. The solution was treated with 0.03 grams of DuPont FSN surfactant. Quartz plates were immersed in the solution and removed at a rate to deposit a coating that was approximately 1.5 microns thick. The coated substrates had an absorbance of about 2.5 at 320 nm after heat treatment to 1000° C.

EXAMPLE IX

The procedure described in Example VIII was used but the Ludox AS colloidal silica sol was replaced with 25 grams of Nalco 1034A colloidal silica sol. After heat treatment as described in Example VIII the coating was approximately 2.7 microns thick and had an absorbance greater than 5 at 320 nm.

EXAMPLE X

Sixty-five grams of the aqueous colloidal cerium oxide sol of Example I was stirred at room temperature. Twenty-five grams of Nyacol Al-20, an aqueous colloidal alumina sol containing 20 weight percent of $Al_2O_3$, was added to the cerium oxide sol with stirring. Twenty-five grams of A-187 were added and the reaction mixture was stirred overnight at room temperature. A combination of 20 grams of 2-propanol, 10 grams of diacetone alcohol, and 0.15 gram of DuPont FSN was added with stirring to the previous combination. Quartz plates were treated with the solution and heated as described in Example IX to give coatings that were greater than 2 microns thick and had absorbance greater than 4 at 320 nm.

EXAMPLE XI

Twenty-five grams of A-187 were stirred at room temperature. Ten grams of 2-propanol were added, followed by a combination of 1.6 grams $H_2O$ and 0.03 gram of concentrated $HNO_3$. The resulting mixture was stirred for ½ hour at room temperature. A mixture of 5 grams of titanium tetraisopropoxide and 5 grams of zirconium n-propoxide (Alfa) was stirred for 2 minutes at room temperature and then added to the previous mixture, and the resulting mixture was stirred for ½ hour at room temperature. Sixty-five grams of the aqueous colloidal cerium oxide sol of Example I was added to the previous mixture and the resulting mixture was stirred for two hours at room temperature. A combination of 30 grams of 2-propanol, 15 grams of diacetone alcohol and 0.1 gram of DuPont FSN was added to the previous mixture with stirring. Quartz plates were treated with the solution and heated as described in the previous Examples to give coatings of similar performance.

EXAMPLE XII

The procedure described in Example X was used but the colloidal alumina sol was replaced with 35 grams of Nyacol Zircon sol, an aqueous colloidal zirconium oxide sol.

Conclusions reached from the successful tests reported in the examples are that higher concentrations of colloidal cerium oxide in the UV absorbing coatings derived from hydrolyzable alkoxides of silicon based sol-gel compositions provide higher absorbance than prior art coating compositions containing lower concentrations of colloidal cerium oxide in said sol-gel compositions, and that in cases where coated quartz substrates are destined for exposure at elevated temperatures over 1000° C. and/or to temperature cycling between room temperature and said elevated temperatures, high curing temperatures after exposing glass or quartz surfaces to said sol-gel compositions comprising colloidal cerium oxide particles essentially uniformly disbursed throughout the sol-gel compositions are needed to reduce and even avoid crazing and haze. Minimum concentration requirements for colloidal cerium oxide particles should preferably exceed 40 weight percent which corresponds to approximately 20 mole percent to provide an absorbance of 1 to 3 at a wavelength of 320 nanometers in coating on the order of 2 microns thick or thinner. Heating temperatures of 500° C. to 1000° C. are used for different sol-gel coating compositions depending upon the tendency of the cured coating to haze and/or to craze after reheating. Coatings essentially free of haze are described as being optically clear.

Conforming to the requirements of the patent statutes, the inventors have described the present invention as completely as possible and have disclosed the details of embodiments that are presently preferred. It is understood, however, that various changes may be made within the gist of this invention without departing from the spirit of this invention which is defined by the claimed subject matter that follows.

What is claimed is:

1. A coated article comprising a substrate of glass or quartz and a coating having an absorbance of 1 to 3 per micron of thickness at 320 nanometers and consisting essentially of colloidal particles of cerium oxide in a silica-based matrix and having a minimum concentration on the order of 40 weight percent of cerium oxide based on the total metal oxide content of said matrix containing said cerium oxide particles, said coated article being essentially craze free and essentially optically clear at 1000° C.

2. A coated article as in claim 1, wherein said silica-based matrix further comprises at least one metal oxide produced from an alkoxide of a metal selected from the group consisting of titanium, zirconium, boron, aluminum and such other metals as form hydrolyzable alkoxides.

3. A coated article as in claim 1, wherein said colloidal particles of cerium oxide have an average particle size on the order of 5 nanometers.

4. A coated article as in claim 3, wherein a considerable portion of said colloidal particles of cerium oxide have a particle size of 3 to 5 nanometers.

5. A coated article as in claim 3, wherein said coating has a maximum thickness on the order of 2 microns.

6. A coated article as in claim 1, wherein said coating has a maximum thickness on the order of 2 microns.

7. A coated article as in claim 1, containing a plurality of said coatings.

8. A coated article as in claim 7, wherein each of said coatings has a maximum thickness on the order of 2 microns.

9. A coated article as in claim 2, wherein said silica-based matrix includes an oxide of titanium.

10. A coated article as in claim 1, wherein said silica-based matrix is formed by heating an organosiloxane of the general formula $R_xSi(OR')_{4-x}$, where R is selected from the group consisting of alkyl, epoxy, glycidoxy and acrylic functional groups, R' is selected from the group consisting of methyl, ethyl, propyl and butyl, and x is at least one and less than four, at a temperature sufficiently high to render said coating resistant to crazing when exposed to temperature cycling between ambient temperature and 1000° C.

* * * * *